M. E. FERNALD.
PROCESS FOR MAKING LEADERS, GEARS, AND THE LIKE.
APPLICATION FILED APR. 12, 1918.

1,431,787.

Patented Oct. 10, 1922.
5 SHEETS—SHEET 1.

Fig 2

M. E. FERNALD.
PROCESS FOR MAKING LEADERS, GEARS, AND THE LIKE.
APPLICATION FILED APR. 12, 1918.

1,431,787.

Patented Oct. 10, 1922.

INVENTOR
Mark E. Fernald
by Charles W. McDermott
his attorney

Patented Oct. 10, 1922.

1,431,787

UNITED STATES PATENT OFFICE.

MARK E. FERNALD, OF SAUGUS, MASSACHUSETTS.

PROCESS FOR MAKING LEADERS, GEARS, AND THE LIKE.

Original application filed June 8, 1917, Serial No. 173,485. Divided and this application filed April 12, 1918. Serial No. 228,109.

*To all whom it may concern:*

Be it known that I, MARK E. FERNALD, a citizen of the United States, residing at Saugus, in the county of Essex and State of Massachusetts, have invented certain Improvements in Process for Making Leaders, Gears, and the like, of which the following description, in connection with the accompanying drawings, is a specification, like reference characters on the drawings indicating like parts in the several figures.

This invention relates to processes of making leaders, gears, and similar machine elements which are provided with teeth or some equivalent members by means of which they are fed or by which they feed some other part. The invention is particularly concerned with processes of making leaders or gears of unusual shapes. The processes usually practised at the present time require the use of a master gear or leader through which to effect the relative positioning movements of the leader or gear blank and the tooth cutting tool for the successive tooth cutting operations; and one of the objects of the present invention is to devise a process for cutting teeth on blanks for gears and leaders of unusual shape which will eliminate the necessity for a master gear or leader. In other words, the invention is directed particularly to the improvement of the step of relatively positioning the leader or gear blank and the tooth cutting tool for the successive tooth cutting operations.

For the purpose of disclosing the best means for practising the invention which has been devised the process will be herein described as carried out by an automatic machine which forms the subject matter of my Patent No. 1,284,882, dated November 12, 1918, filed June 8, 1917, Serial No. 173,485 of which this application is a division. This machine is designed particularly to cut gear teeth or the like on leaders intended for use in automatic shoe machines. Leaders of this character are usually designed to feed a shoe, or some part used in the manufacture of a shoe, past a tool or tools that perform some step in the process of manufacture of the shoe. These leaders usually have substantially the peripheral outline of a shoe sole; and this irregular outline and the presence in that outline of lateral reverse curves make it impracticable to form teeth on such leaders by any of the commercial gear cutting processes or machines. The difficulty involved in cutting teeth on leaders of this character is, that the teeth must be spaced in a predetermined manner along the periphery of the leader blank and, more particularly, that each tooth must bear a predetermined angular relationship to the leader. It is obvious that if ordinary gear teeth are formed they must be equally spaced apart and each tooth must be substantially normal to the pitch line of the leader. Ordinary gear cutting machines are designed to form such teeth on circular, elliptical or other gears having a regular geometrical outline but are not adapted to cut teeth even on unusual or complicated shapes of gears of this character and certainly not on leader blanks having substantially the outline of a shoe sole.

The process of the present invention effectually solves these problems and this solution is applicable not only to sole shaped leaders, but also to the manufacture of gears and similar machine elements which require the formation of projections or cuts that may not, in the language of the trade, be designated as "teeth," but which perform substantially the same functions, such for instance, as holes for the engagement of the pins of a pin wheel, or the like. In fact, the invention can be advantageously used in a wide range of work where accurate spacing of the points of operation of the tool or the maintenance of a definite angular relationship between the tool and the work while the tool operates along a curved peripheral contour of the work, is required.

In the accompanying drawings:

Figure 1 is a front elevation of a machine operating in accordance with the process of this invention;

Figs. 9 and 10 are plan and side views, respectively, of the leader which the machine shown is particularly designed to operate on.

Briefly stated, the machine shown comprises a work supporting table, on the surface of which the work is freely movable; a cutter arranged to move up and down past said table and operative to make tooth-cuts in the peripheral edge of the blank; a work feeding finger which operates on each tooth-cut immediately after it is formed to feed the blank past the cutter into position for the next cut; additional mechanism that acts on the blank to position it in the proper angular relationship to the cutter for the next cut; and a clamp which holds the work in the new position to which it is adjusted by these mechanisms while the cutter makes a tooth-cut and then releases the work again for the next feeding and positioning movements. The detailed description of these parts and mechanisms will be taken up in substantially the order in which they have just been mentioned.

Figure 4:
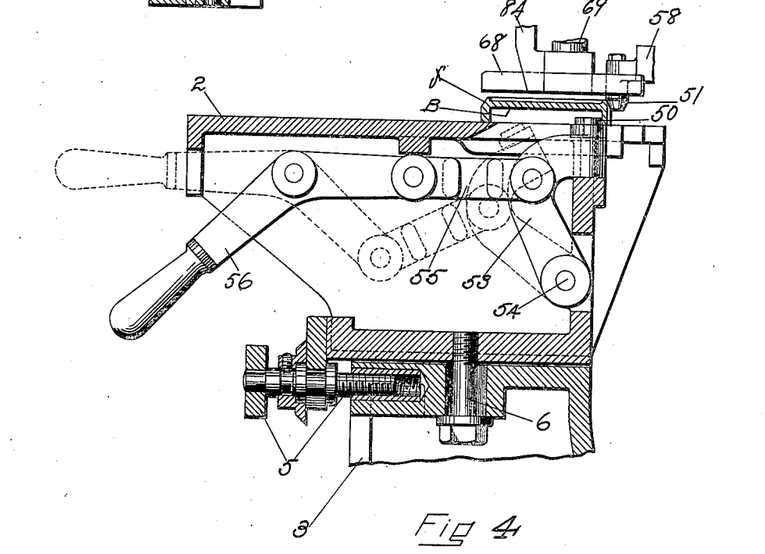
Fig. 4 is a vertical cross sectional view through the work support, showing part of the work positioning mechanism.

Referring now to the drawings, 2 indicates a work supporting table having a smooth horizontal surface on which the blank B is supported. This table is mounted on an arm 3 that projects upwardly from the main frame 4 of the machine and it is supported in ways enabling it to be adjusted forward and backward with relation to the arm 3, a screw-adjusting mechanism 5, which is best shown in Fig. 4, being provided to enable the workman to make a fine adjustment. A bolt 6 projects through a slot formed in the upper part of the arm 3 and secures the table 2 in an adjusted position and also holds the table against movement out of the ways in which it rests.

The teeth are cut in the blank B by means of a rotary cutter 7 (Figs. 2 and 8) mounted on a shaft 8 which is supported in suitable bearings formed in a bracket 9. This cutter is driven by a train of gears, best shown in Fig. 8, from a shaft 10 at the lower end of the bracket 9 and which is driven through a spiral gear connection with another shaft 11 (Fig. 2) lying transversely to the shaft 10. A telescoping shaft 12 is connected by universal joints with the shaft 11 and the main driving shaft 13 and transmits power from the latter shaft to the shaft 11. These connections thus are operative to transmit positively rotative motion from the main shaft 13 to the cutter 7.

Figures 8, 11:
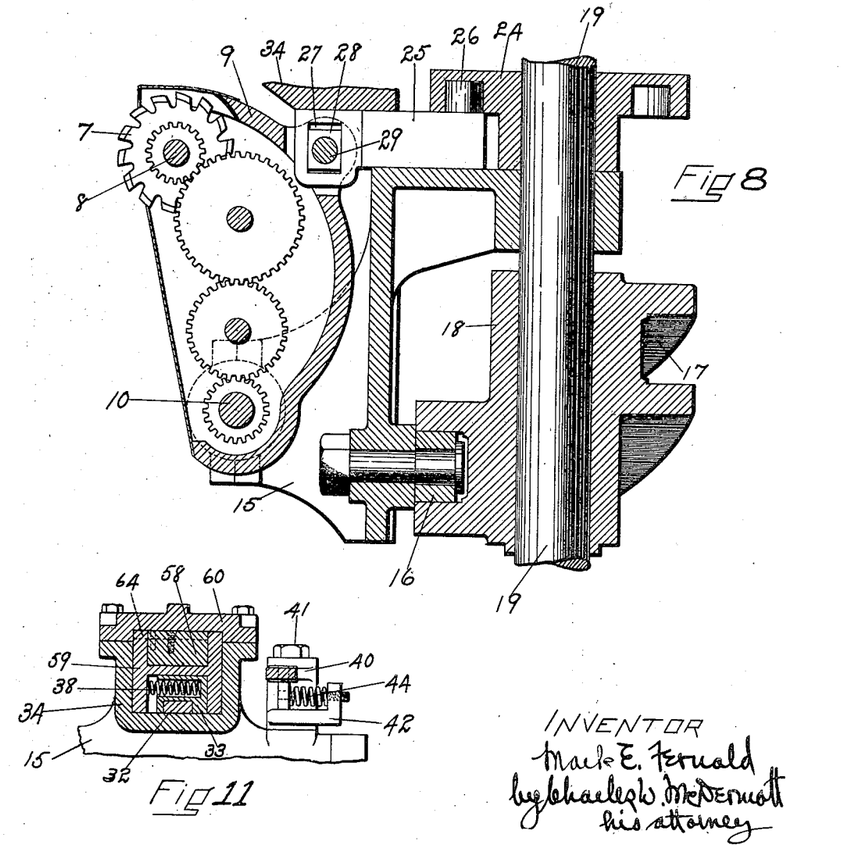
Fig. 8 is a vertical cross sectional view through a part of the mechanism that operates the cutter.
Fig. 11 is a cross sectional view taken substantially on the line 11—11, Fig. 5.

The bracket 9 is raised and lowered and also is moved in and out and, for this purpose, it is supported on another bracket 15, Fig. 8, which carries a cam roll 16 running in a cam path 17 formed in a cam 18 that is mounted fast on a vertical shaft 19 supported in the main frame 4. The lower end of this shaft 19 has fixed thereto a worm wheel 20 (Fig. 2) which meshes with a worm 21 mounted fast on a shaft 22 that is driven by gear connections with the main driving shaft 13. The rotative movement imparted to the shaft 19 in this manner acts through the connections just described to raise and lower the cutter 7, carrying it up and down past the edge of the blank B supported on the table 2, and thus gives to the cutter its cutting stroke. Obviously all the parts supported by the brackets 9 and 15 are moved up and down by this mechanism.

In order to move the cutter 7 in and out at the proper points in its up and down movement, a cam 24 (Fig. 8) is mounted on the bracket 15 and is splined to the shaft 19 so that it rotates with the shaft but can move up and down with the bracket 15. A short slide 25, also mounted in the bracket 15, carries a roll 26 that runs in the path of the cam 24 and is provided at its forward end with a slot 27 in which is received a block 28 that swings on a pin 29 carried by ears with which the bracket 9 is provided. These connections swing the bracket 9 about the axis of the shaft 10, and the cams 24 and 18 are so timed that the cutter 7 is swung backwardly away from the blank B while it is being moved upwardly and is moved forward while at the upper end of its stroke and it is held in this position while it is making its downward movement. Stated in another way, these connections cause the cutter to cut a tooth slot in the work while the cutter is making its downward stroke but cause the cutter to make an idle upward stroke.

Figures 1, 9, 10:
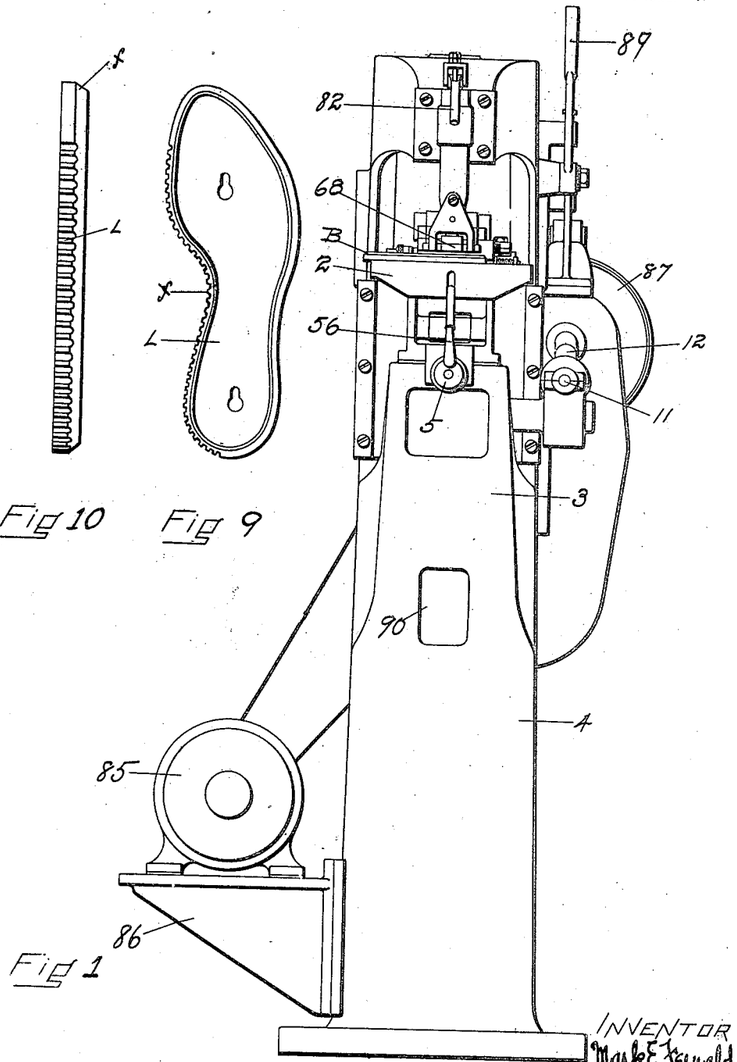

The blank shown in the drawings has the general shape of a shoe sole and the blank when finished constitutes the leader L, shown in Figs. 9 and 10. This blank when brought to the machine has a main horizontal body portion, which is relatively thin, and a peripheral flange f, Fig. 4, which projects both above and below the body portion and is bevelled along its upper edge, as clearly indicated in said figure. The upper and lower faces of the flange lie substantially in parallel planes so that the blank rests evenly on the flat upper face of the work supporting table 2. The teeth are formed in the outer peripheral edge of the flange f and the part of this flange being operated upon projects over a slot formed in the rearward part of the table 2.

As above stated, the cutter 7 makes a tooth-cut in the flange f of the blank on its downward stroke and it is next necessary to effect a relative movement of the cutter and blank in order to bring them into the proper relationship for the next tooth-cutting operation. This movement is produced, in the machine shown, by the joint action of a feed finger 30, that engages the tooth-cut last formed and pushes the blank transversely across the line of cut, and an additional mechanism which operates to move the blank into the proper angular relationship to the cutter for the formation of the next tooth slot.

Figure 5:
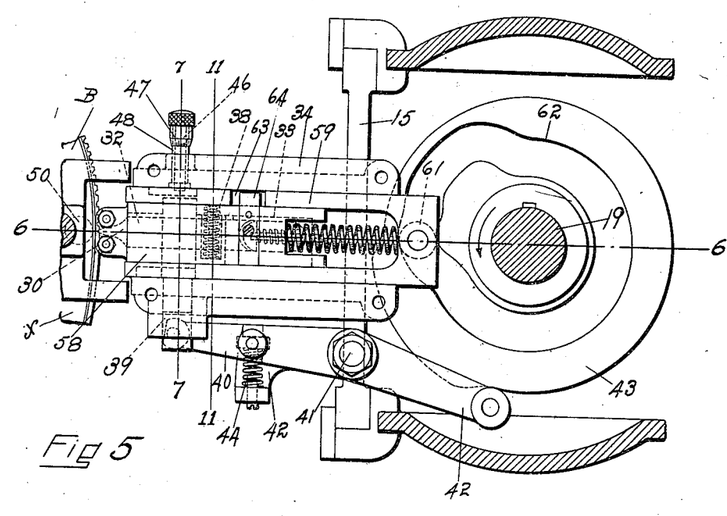
Fig. 5 is a horizontal sectional view through the work feeding and positioning mechanism with the cover plate for a part of this mechanism removed.
Figure 6:
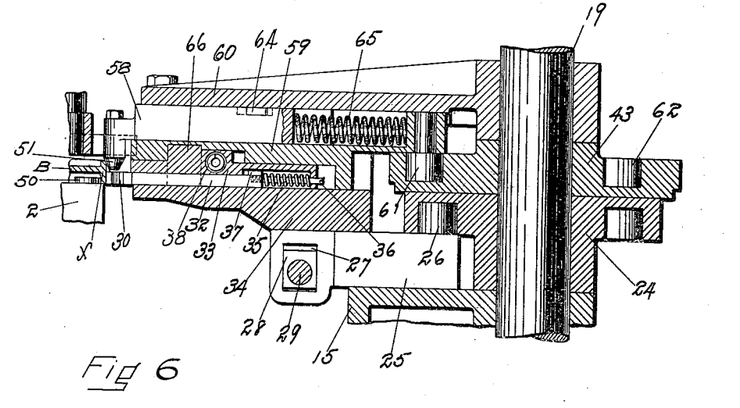
Fig. 6 is a vertical sectional view taken substantially on the line 6—6, Fig. 5.
Figure 7:
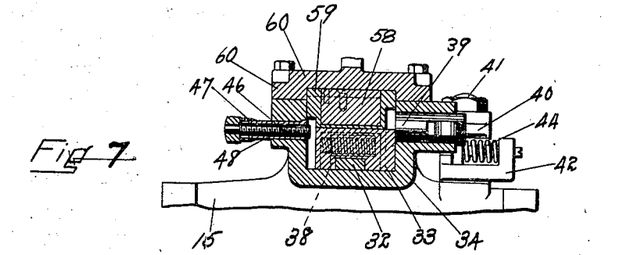
Fig. 7 is a vertical transverse sectional view on the line 7—7, Fig. 5.

The finger 30 is formed on the forward end of a slide 32 which is mounted on a guideway in a transverse slide 33 supported in a slot formed in a part 34 of the bracekt 15. A spring 35, encircling a rod 36, Fig. 6, acts between the parts 32 and 33 to move the finger 30 forward to the outermost limit of its stroke, this limit being determined by the engagement of a block 37 which it carries with the end of a slot formed for said block in the part 33. This finger thus can have a limited forward and backward movement with reference to the slide 33 but is compelled to move laterally with said slide. As clearly shown in Fig. 7, the slide 33 does not fill the slot in which it is mounted in the part 34 but can move laterally in this slot. A coiled spring 38 located in a hole drilled in the slide 33 and abutting against the part 59, Fig. 11, acts on this slide to hold it normally against the right hand side of its slot as it appears in Fig. 7. Both the slide 33 and the finger 30 are moved laterally to effect the feeding movement of the blank B by connections comprising a plug 39, (Figs. 5 and 7) positioned in a hole formed in one wall of the part 34 and arranged to bear against the right hand side of the slide 33 as it is shown in Fig. 7, a lever 40 pivoted to the outer end of the plug 39 and fulcrumed on a stud 41, and another lever 42 also fulcrumed on the stud 41 and carrying a roll which runs on the periphery of a cam 43, the movement of this lever being transmitted to the lever 40 through a spring 44 that is interposed between these two levers. These connections act to yieldingly move the slide 43 transversely of its slot against the pressure of its spring 38. The extent of this movement is controlled by an adjusting screw 46, Fig. 7, threaded through a bushing 48 mounted fast on the part 34 and carrying a head having a graduated sleeve 47 designed to move over graduations formed on a projecting part of the bushing 48 so that a very fine adjustment of the screw can be made. This adjustment determines the extent of each feeding movement of the blank B and consequently this screw should be set in accordance with the pitch of the teeth to be cut in the leader.

The mechanism for positioning the blank B in the proper angular relationship to the cutter comprises a circular stud 50 (Figs. 4 and 5) mounted to engage the inner face of the flange f directly opposite the point of operation of the cutter and two rolls 51 arranged to engage the opposite face of the flange and mounted at opposite sides of the axis of the stud 50. Preferably the rolls 51 are frusto-conical in shape, as clearly shown in Fig. 4, so that they will fit snugly against the upper bevelled face of the flange of the blank. The stud 50 is mounted on a bell crank lever 53 (Fig. 4) which is fulcrumed on a pin 54 supported in a part of the work supporting table 2. A link 55 and a bell crank lever 56, one arm of which forms a handle and the other arm of which is pivoted to the link 55, constitute a toggle mechanism designed to hold the stud 50 in a fixed position against the inner face of the flange f when the parts are in the positions in which they are shown in full lines in Fig. 4, and to withdraw the stud 50 to a point below the level of the work supporting face of the table 2 and permit the removal of the work when the parts are moved into the positions in which they are shown in dotted lines in Fig. 4. The two rolls 51 are mounted on short vertical stub shafts which are secured in the vertical end of a slide 58 that is movable forward and backward in a cam follower 59 mounted to slide forward and backward in a guideway formed in a cap 60 which is bolted to the part 34, as clearly shown in Figs. 6 and 7. The cam follower 59 carries a cam roll 61 running in a cam path 62 formed in the cam 43. A limited amount of relative sliding movement between the parts 58 and 59 is permitted by means of a slot 63 formed in the part 59 and a lug 64 secured to the slide 58 and working in said slot. Normally the slide 58 is held at the forward limit of its stroke with reference to the cam follower 59 by means of a stiff coiled spring 65 mounted between these parts. A transverse tongue 66, Fig. 6, formed in the part 33 and entering a correspondingly shaped groove formed in the cam follower 59, compels the feed finger 30 to be advanced and withdrawn with the cam follower 58 except for the limited amount of movement provided between the parts 33 and 32, as above described.

It will now be understood that after the cutter 7 has made its downward stroke and has formed a tooth slot in the edge of the blank B, the feed finger 30 will be allowed to advance, by virtue of the forward movement of the cam follower 59 produced by the cam 43, and will permit the end of this finger to enter the tooth slot just formed by the cutter 7. The peripheral cam surface of the cam 43 will then operate through the levers 42 and 40 and the plug 39 to move the finger 30 laterally as far as the adjustment of the set screw 46 will permit, thus causing the finger 30 to feed the blank past the cutter and bring an uncut portion of the edge of the blank opposite the cutter. The forward movement of the cam follower 59 is transmitted yieldingly through the spring 65 and the slide 58 to the rolls 51, thus causing them to bear against the outer face of the flange $f$ of the blank and hold the flange against the fixed stud 50. The pressure exerted on the rolls 51 at this time is relatively light although probably sufficient to maintain the blank in substantially the proper angular relationship to the cutter while this transferring movement is being made, since the blank at this time is free to move on the surface of the table 2. As soon, however, as this feeding movement has been completed, the cam 43 acts through the parts 61, 59, 65 and 58 to press the rolls 51 forward with an increased pressure, causing them to co-operate with the stud 50 to swing the blank B into the proper angular relationship to the cutter for the next cut, provided, of course, the blank has not already been moved into that position by the light pressure previously exerted on the rolls 51. The axis of the stud 50 is in vertical alignment with the cutter 7 and the central vertical plane of this cutter passes midway between the axes of the rolls 51. The flange $f$ is substantially uniform in thickness at all points along the periphery of the blank. Accordingly, this mechanism operates with great certainty to move the blank into such a position that the cutter will be normal to the pitch line at the point of operation of the cutter, regardless of the lateral curvature of the edge of the blank. This, obviously, is the proper angular relationship for the cut. It will be noted that the swinging movement of the blank takes place about an axis extending substantially through the point of operation of the cutter.

This work positioning mechanism is of particular value in operating on irregular leader blanks or gears, particularly those having lateral reverse curves in their peripheries, since it will properly position the blank for each cut notwithstanding variations in curvature or in shape or size of the blanks. The necessity for making the usual master gears thus is avoided and the only changes necessary to enable the machine to operate on different sizes and styles of blanks is to select the proper cutter 7, to make the proper adjustment of the screw 46 for the pitch of the tooth and to adjust the screw 5 which controls the depth of the cut made by the cutter 7. It will be noted that the work positioning mechanism (with the exception of the stud 50) is all supported either directly or indirectly by the bracket 15 which is moved up and down by the cam 18, this bracket being mounted in suitable ways formed in the machine frame, as clearly shown in Fig. 5.

Figure 3:
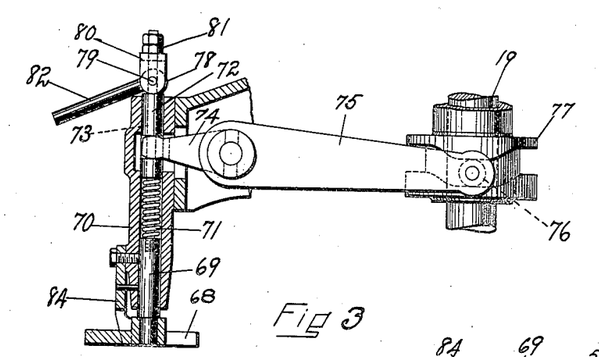
Fig. 3 is a vertical cross sectional view of the presser foot or clamping mechanism that holds the work on the work table while a tooth is being cut.

A clamping mechanism is provided which clamps the blank against the surface of the table 2 while each tooth cut is being made and releases the blank again after each tooth-cutting operation has been performed to permit the feeding and angling mechanism to position the blank for the next cut. This clamping mechanism comprises a clamp or presser foot 68, Fig. 3, arranged to bear on the upper face of the blank and mounted on the lower end of a slide 69 arranged to move up and down in a guideway formed in a bracket 70 that is secured to the frame of the machine. A spring 71 is interposed between the upper end of the slide 69 and the lower end of another slide 72 mounted above the part 69 and encircles a rod 73 that is threaded into the member 69. The slide 72 is grooved to receive the bifurcated end of one arm 74 projecting forward from a lever 75 which carries a cam roll 76 running in the path of a cam 77 mounted fast on the shaft 19. This cam is so timed with reference to the operations hereinbefore described, that it acts through the connection just described to apply a heavy pressure to the clamp 68 after the work has been moved into position for a new cut and causes the clamp to hold the work firmly against the table during the cutting operation. As soon as the cutting operation has been completed, the cam 77 acts through its connections with the clamp 68 to raise this clamp from the work and allow the work positioning mechanism to move the blank B freely over the surface of the table 2 into position for the next cut. The lifting movement of the lever arm 74 is transmitted to the rod 73 through the sleeve 72, a cam 78 that bears on the sleeve, and the shaft 79 of this cam which is mounted in the opposite legs of a U-shaped member 80 that bears against a nut 81 threaded on the upper end of the rod 73. The cam 78 is provided with a handle 82 which enables the workman to raise the presser foot 68 from the work. Any possibility of the clamp 68 turning with reference to the part 69 is prevented by a guide piece 84 which is bolted to the bracket 70 and straddles one member of the clamp 68.

The machine may be driven in any convenient manner. In the arrangement shown an electric motor 85 is supported on a suitable bracket 86 mounted on the machine base and is belted to a pulley 87 mounted loosely on the main shaft 13. This pulley is designed to be operatively connected to said shaft by a clutch 88. Suitable connections, clearly shown in Fig. 2, between the clutch 88 and a hand lever 89 control the clutch and enable the workman to throw the power on or off quickly.

Figure 2:
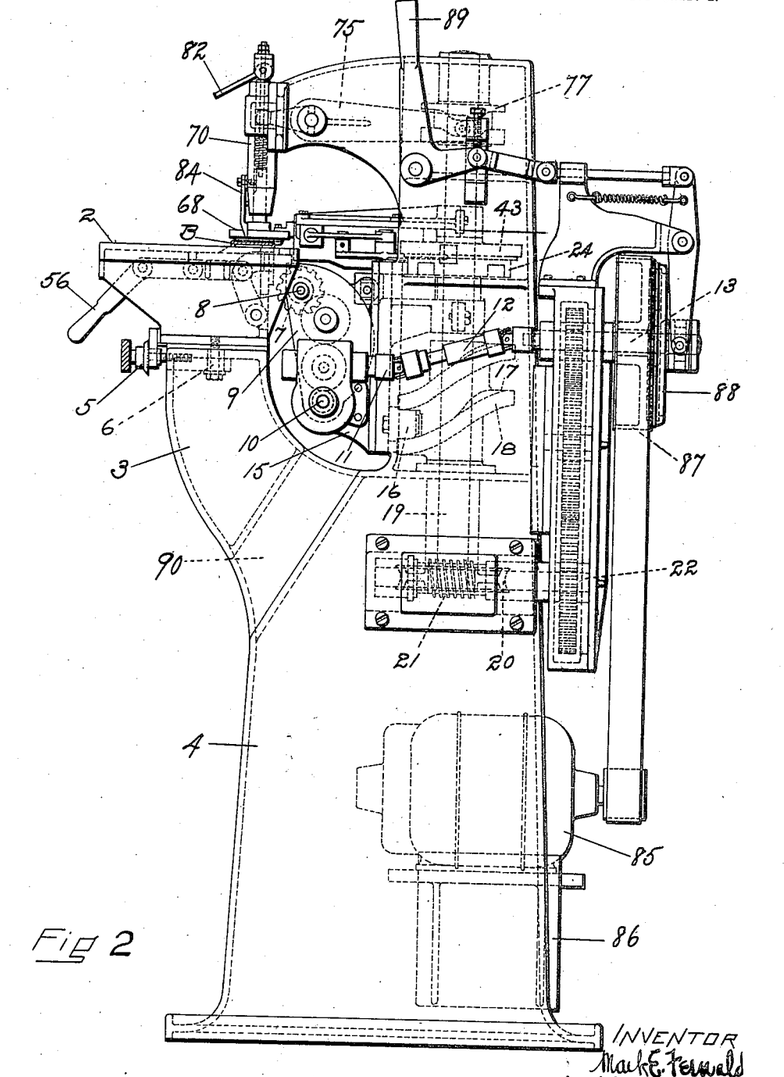
Fig. 2 is a right side elevation of said machine.

A passage 90, Fig. 2, directed downwardly through the arm 3 from a point near the base of this arm, provides a convenient passage for the discharge of the metal chips that are thrown off by the cutter 7 and prevents these chips from accumulating at a point where they might interfere with the proper operation of some of the moving parts.

The particular form of leader shown in Figs. 9 and 10 is designed for use in automatic machines in which guiding mechanism is employed that comprises rolls constructed and operating similarly to the stud 50 and rolls 51. Consequently a use is made in these machines of the bevelled flange $f$ with which this leader is provided. It is contemplated, however, that for some purposes this particular form of flange might not be desirable, and it is obvious that the bevelled portion of this flange could be turned off after the tooth cutting operation has been completed, or the blank angling mechanism might be modified to suit the requirements of the particular piece of work to be operated upon.

It will also be understood that the invention is not limited in its application to the specific form of machine described or to any other specific machine or apparatus, but that it may be successfully practised with the aid of a great variety of mechanisms, the foregoing description being intended by way of explanation rather than limitation.

What is claimed as new, is:

1. That improvement in the process of making leaders and gears which consists in providing a suitable blank for a leader or gear, forming on said blank a guiding part bearing a predetermined relationship to the pitch line of the teeth to be formed on the blank, and then cutting the teeth on said blank while utilizing successive portions of said guiding part to effect relative positioning movements of the tooth cutting tool and the blank necessary to bring them into proper relationship for the successive tooth cutting operations.

2. That improvement in the process of making leaders and gears, which consists in providing a suitable blank with a guiding surface having a predetermined relationship to the pitch line of the teeth to be formed on the blank and then cutting the teeth on said blank while utilizing successive portions of said guiding surface to effect the relative angular movements of the cutting tool and the blank necessary to bring them into the proper angular relationship for the successive tooth cutting operations.

3. That improvement in the process of making leaders and gears, which consists in providing a suitable blank with a flange having inner and outer faces parallel to the pitch line of the teeth to be formed on the blank, and then cutting the teeth on said blank while utilizing said flange to effect the relative angular movements of the cutting tool and the blank necessary to bring them into the proper angular relationship for the successive tooth cutting operations.

4. That improvement in the process of making leaders and gears which consists in providing a blank for a leader or gear with a finished surface adjacent to the pitch line of the teeth to be cut thereon, and then cutting the teeth on said blank while utilizing said surface to effect the successive relative positioning movements of the tooth cutting tool and the blank necessary to bring them into the proper relationship for the successive tooth cutting operations.

5. That improvement in the process of cutting teeth in the blanks for leaders, gears, and the like, which consists in utilizing the tooth-cuts made in the blank to feed the blank into position for successive tooth-cutting operations, and utilizing a part of the blank adjacent to the point at which the tooth-cutting operation is being performed to relatively swing the blank and the tooth-cutting tool into position for the successive tooth-cutting operations.

6. That improvement in the process of making leaders, gears and the like, which consists in providing a suitable blank with a curved guiding surface having a predetermined relationship to the pitch line of the teeth to be formed on the blank, cutting the teeth in said blank while utilizing a tooth cut made in the blank to feed the blank into position for a subsequent tooth cutting operation, and acting on said curved guiding surface of the blank adjacent to the point of formation of each tooth to position the blank in the correct angular relationship to the tooth cutting tool for each tooth cutting operation.

7. That improvement in the process of cutting teeth in the blanks for leaders, gears, and the like, which consists in making a tooth-cut in the blank, utilizing the cut so made to feed the blank into position for the next tooth-cutting operation, acting on the surface of the blank adjacent to the point at which the next tooth-cut is to be made to swing the blank relatively to the tooth-cutting tool into the correct angular relationship to the tool for the next tooth-cutting operation, and repeating said operations until the required number of teeth have been formed.

8. That improvement in the process of making leaders, gears, and the like, which consists in providing a suitable blank with a curved guiding surface having a predetermined relationship to the pitch line of the teeth to be formed on the blank, and then cutting the teeth on said blank while utilizing a tooth-cut made in the blank to feed it into position for a subsequent tooth-cutting operation, and utilizing said guiding surface to maintain the proper angular relationship between the cutting tool and the blank for the successive tooth-cutting operations.

9. That improvement in the process of making leaders, gears, and the like, which consists in providing a suitable blank, cutting the teeth on said blank, and relatively swinging the blank and the tooth-cutting tool between successive tooth-cutting operations about an axis passing substantially through the point of operation of said tool to bring the blank and tool into the proper relationship for the next tooth cutting operation.

10. That improvement in the process of making leaders, gears, and the like, which consists in providing a suitable blank with a guiding surface lying adjacent to the pitch line of the teeth to be cut on said blank, and cutting the teeth on said blank while utilizing said guiding surface to swing the blank into the correct position for the successive tooth-cutting operations.

11. That improvement in the process of making leaders and irregular gears, which consists in providing a suitable blank, cutting the teeth in said blank one at a time, and moving the blank between successive tooth cutting operations into position for the next tooth cutting operation by acting on a portion of the blank adjacent to the point at which the next tooth is to be cut to feed and swing the blank into the proper position for the cutting of said tooth.

12. That improvement in the process of making leaders for use in automatic shoe machines which consists in providing a suitable blank having lateral reverse curves thereon corresponding to the outline of a shoe sole, forming on said blank a guiding surface bearing a predetermined relationship to the pitch line of the teeth to be formed on the blank, and then cutting the teeth on said blank while utilizing said guiding surface to effect relative positioning movements of the tooth-cutting tool and blank to maintain the tool radial to the curvature of the blank at the point of operation.

In testimony whereof I have signed my name to this specification.

MARK E. FERNALD.